US008518134B2

(12) United States Patent
Meyer et al.

(10) Patent No.: US 8,518,134 B2
(45) Date of Patent: Aug. 27, 2013

(54) METHOD AND DEVICE FOR THE ENTRAINED-FLOW GASIFICATION OF SOLID FUELS UNDER PRESSURE

(75) Inventors: Bernd Meyer, Freiberg (DE); Peter Seifert, Großräschen (DE); Steffen Krzack, Freiberg (DE); Sirko Ogriseck, Freiberg (DE); Hardy Rauchfuss, Chemnitz (DE); Mathias Rieger, Dresden (DE); Michael Trompelt, Langenhessen (DE); Stefan Guhl, Frohburg (DE)

(73) Assignee: Technische Universität Bergakademie Freiberg, Freiberg (DE)

( * ) Notice: Subject to any disclaimer, the term of this patent is extended or adjusted under 35 U.S.C. 154(b) by 882 days.

(21) Appl. No.: 12/525,927

(22) PCT Filed: Feb. 7, 2008

(86) PCT No.: PCT/EP2008/051497
§ 371 (c)(1),
(2), (4) Date: Sep. 25, 2009

(87) PCT Pub. No.: WO2008/095977
PCT Pub. Date: Aug. 14, 2008

(65) Prior Publication Data
US 2010/0088959 A1    Apr. 15, 2010

(30) Foreign Application Priority Data
Feb. 7, 2007   (DE) .......................... 10 2007 006 981

(51) Int. Cl.
*C01B 3/36*      (2006.01)
*C01B 6/24*      (2006.01)
*C10J 3/00*      (2006.01)

(52) U.S. Cl.
USPC ............. 48/197 R; 48/210; 423/644; 422/139

(58) Field of Classification Search
USPC ........ 48/61, 127.9, 76, 197 R, 210; 422/139; 423/644
See application file for complete search history.

(56) References Cited

U.S. PATENT DOCUMENTS
3,782,913 A * 1/1974 Donath .......................... 48/202
4,146,369 A   3/1979 Flesch et al.
(Continued)

FOREIGN PATENT DOCUMENTS
DE    2640180 A    3/1978
EP    0214417   *  3/1987
(Continued)

OTHER PUBLICATIONS
Ullmann's Encyclopedia of Industrial Chemistry, Sixth Completely Revised Edition, Wiley-VCH Verlag GmbH & Co. KGaA, Weinheim, Germany, 2003, vol. 15, pp. 363, 371-378.

*Primary Examiner* — Matthew Merkling
(74) *Attorney, Agent, or Firm* — Gudrun E. Huckett

(57) ABSTRACT

The invention relates to a gasification reactor (1) and associated method for the entrained-flow gasification of solid fuels under pressure. The reactor essentially consists of a pressure vessel (4) that can be cooled and an inner jacket (7) that is equipped with a heat shield. At least one crude gas outflow (8) is located at the upper end of the cylindrical pressure vessel and at least one bottoms withdrawal outlet (30) is located at the lower end, the pressure vessel having at least enough space for a moving bed (13), an entrained flow (11) that circulates internally above the surface of the moving bed and a buffer zone (3) situated above said entrained bed. Feed connections for the solid fuels (15) and gasification agent nozzles for the supply of first gasification agents (16) are situated at a height of between approximately 1 and 3 meters above the surface of the moving bed, said gasification agent nozzles being designed to inject the first gasification agents into the entrained flow in such a way that a hot central upward flow and a "cold" downward wall flow are formed. At least one feed device for second gasification agents (28) is located at the bottoms withdrawal outlet.

10 Claims, 1 Drawing Sheet

(56) References Cited

U.S. PATENT DOCUMENTS

| | | | | |
|---|---|---|---|---|
| 4,412,910 A | * | 11/1983 | Archer et al. | 208/409 |
| 4,445,910 A | | 5/1984 | Zimmerman | |
| 4,770,237 A | * | 9/1988 | Morin et al. | 165/104.16 |
| 4,799,937 A | * | 1/1989 | Nieminen | 48/62 R |
| 2005/0072341 A1 | | 4/2005 | Sprouse | |
| 2008/0210055 A1 | * | 9/2008 | Orth et al. | 75/444 |
| 2009/0188165 A1 | * | 7/2009 | Ariyapadi et al. | 48/210 |

FOREIGN PATENT DOCUMENTS

| | | |
|---|---|---|
| EP | 0214417 A | 3/1987 |
| EP | 0554529 A | 8/1993 |
| GB | 1597691 A | 9/1981 |

* cited by examiner

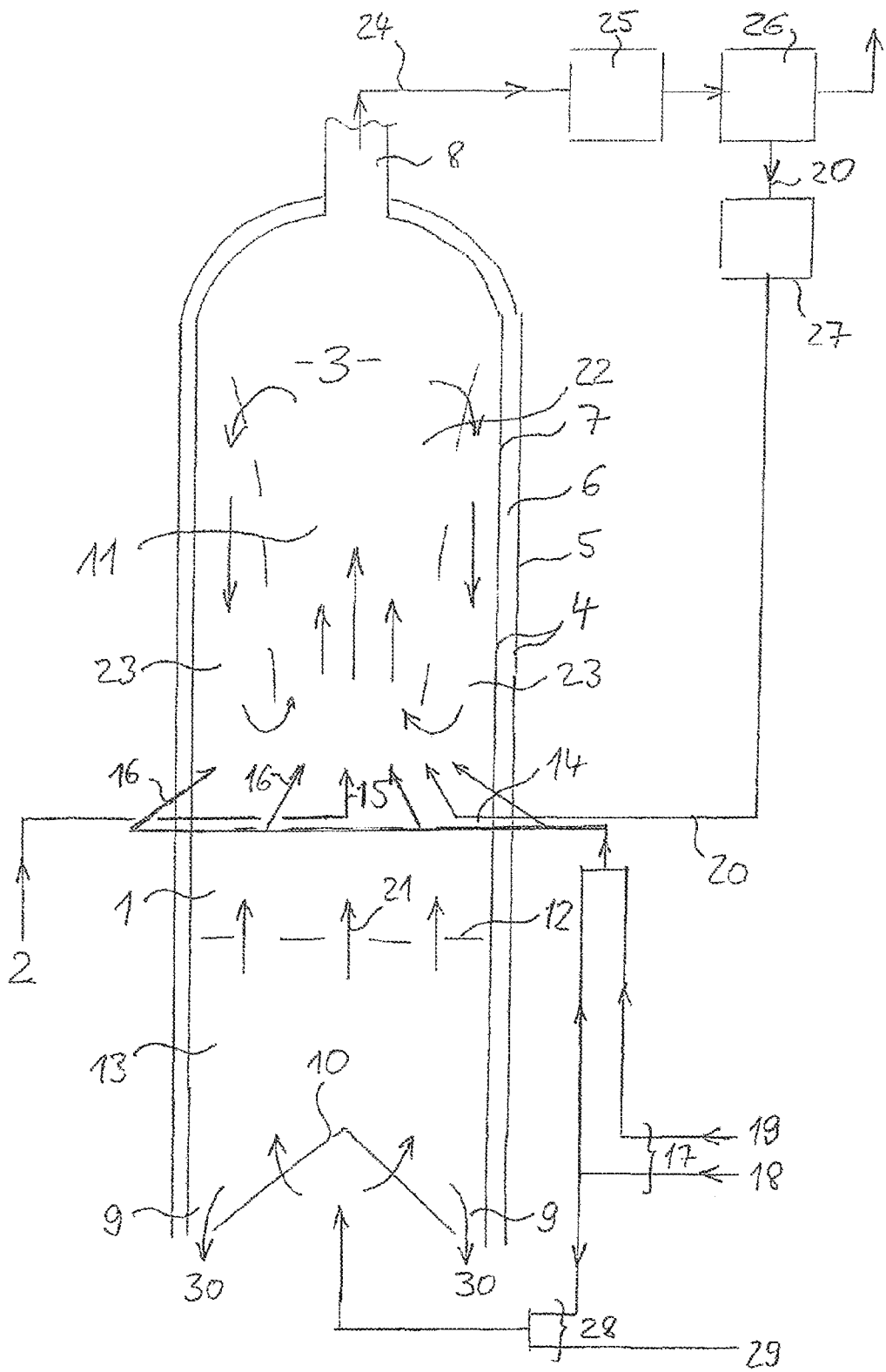

METHOD AND DEVICE FOR THE ENTRAINED-FLOW GASIFICATION OF SOLID FUELS UNDER PRESSURE

BACKGROUND OF THE INVENTION

The invention relates to a method and a device for the entrained-flow gasification of solid fuels under pressure.

The known methods for the entrained-flow gasification convert pulverized carbonaceous (C-containing) fuels to the gasification products crude gas and slag at temperatures above the flow point of the ash, using gasification agents that predominantly consist of oxygen. In order to melt the ash, very high temperatures are essential in the gasification chamber. The temperatures range from approximately 1400 to 1600° C., depending on the flow point of the ash. At such high temperatures the crude gases and the slag must be drawn off at the outlet from the entrained-flow gasifier. The specific oxygen demand related to the pulverized fuels is higher by approximately 20 to 30% compared with gasification methods that like the fluid-bed methods function at temperatures obtaining outlet temperatures of the crude gases that are lower by approximately 400 to 600 K. High-ash fuels with ash contents of more than approximately 20 mass-%, related to the dry fuel, and having high ash flow points of over approximately 1400° C. cannot be utilized with energetic efficiency nor at economically acceptable conditions in known entrained-flow gasification methods. Furthermore, the entrained-flow gasification has the decisive disadvantage that very high operational and plant efforts are required in order to separate the slag from the crude gases before the further use thereof if, in particular, it is intended to utilize the sensible heat of the hot crude gases that exit the entrained-flow gasifier for waste-heat steam generation. For that the crude gases must be extremely cooled/quenched directly after having left the gasification chamber of the entrained-flow gasifier over a short distance, before they can be allowed to enter the crude gas heat exchangers. Many versions of external quenching of the crude gases have been developed, with the gas quench and the chemical quench having been successful. The use of the gas quench causes losses in usable heat (exergy). The chemical quench where carbon-containing substances are mixed into the hot crude gas flow largely avoids this disadvantage. In continuous operation, however, the chemical quench involves considerable technological effort and serious drawbacks such as tar and soot formation, and the formation of crusts. In order to avoid the high efforts of utilizing the waste heat, alternatively the hot, slag-laden crude gases exiting the entrained-flow gasifier are water-quenched. This is easy and robust but is disadvantageous in that the low-temperature heat developed by the water evaporation can only rarely be utilized in practice.

DE 26 40 180 B discloses the gasification of solid fuels with different grain sizes (from dust to coarse-grained) using a lower fixed bed and an upper dust gasification zone, whereby a fluidized bed is created above the fixed bed and further above a dust gasification is intended to be performed. The solid fuel is to enter the fluidized bed. In the process itself, it is intended to separate the fuel into proportions of different sizes.

Teachings of DE 26 40 180 B are not suitable to achieve a complete gasification, because substantial amounts of ash-containing coke dust enter the product gas and have to be separated therefrom. Re-feeding the coke dust into the process cannot be considered, as ash-containing dust proportions would very soon enrich in the process to such an extent that the process would come to a standstill. Furthermore, other fundamental problems remain unsolved, particularly the adaptation of the process control to the grain size distributions that frequently change by accident and variations of the ash content of both the total ash and the different grain size fractions. The fixed bed, for example, would "grow into" the fluidized bed when the coarse grain proportion of the solid fuels becomes too high and no sufficient amount of the gasification agent can be fed into the fixed bed for balance and fluid dynamic limitations. At least for the reasons mentioned the process proposal according to DE 26 40 180 B has not been successful in technology.

From the disadvantages listed above the problem of the invention derives as to further develop the fundamentals of the process of entrained-flow gasification in order to solve the serious disadvantages of the entrained-flow gasification, particularly allowing high-ash fuels having high ash-flow temperatures to be processed without problems, the crude gases exiting the gasifier to be fed to a waste heat utilization without demanding any external quenching and the produced ashes or slags to be separated to a low plant technological expense from the crude gases and discharged from the entrained-flow gasifier, while it has to be ensured that the used pulverized fuels are practically completely gasified in the entrained-flow gasifier.

SUMMARY OF THE INVENTION

The problem of the invention is solved by a method for the entrained-flow gasification of solid fuels under pressure where solid fuels are transformed by use of gasification agents that largely consist of oxygen in an entrained flow to crude gas and slag as the gasification products, whereby in an upward internally circulating entrained flow, using first oxygen-rich gasification agents a) the practically complete gasification of the carbonaceous components of the solid fuels and
b) a thermal treatment of aftergasification crude gases and also
c) the granulation of the ash at temperatures above the ash-softening temperature take place, whereby carbon-containing gasification residues, ash granulates and dust-laden crude gases are formed and dust-laden crude gases are drawn off at temperatures below the critical ash-sintering temperature from the entrained flow upward into a buffer zone and from there passed to further processing, whereby the first gasification agents are injected into the entrained flow in such a way that a hot central upward flow and a "cold" downward wall flow are formed, whereby in a moving bed located below the entrained flow by use of second low-oxygen gasification agents an almost complete to totally complete oxidation of the carbon-containing gasification residues and ash granulates that leave the entrained flow downward takes place at temperatures below the ash-softening temperature, whereby aftergasification crude gases and oxidized bottom products are formed, whereby the second gasification agents are supplied in such an amount and composition that on the one hand, the ash-softening temperature will not be exceeded in the moving bed and on the other hand, the moving bed will be regularly passed, and whereby the oxidized bottom products are drawn off from the moving bed downward in countercurrent to the second gasification agents and the aftergasification crude gases are passed upward from the moving bed into the entrained flow.

As solid fuels, preferably solid fuels are used that essentially contain pulverized fuels and carbonaceous dusts. Further, also special forms of solid fuels such as fuel/water- or fuel/oil slurries with variable solids concentration can be used. The solid fuels can be used for entrained-flow gasification in dry form and/or in one or several of said special forms. The solid fuels comprise a wide range of coals, biomasses or carbonaceous waste substances, to a low extent even liquid or gaseous fuels or residual substances.

The crude gases drawn off from the entrained flow are for further processing preferably passed to indirect heat exchangers and subsequently to dust separators. In the dust separators the C-containing dusts are almost completely separated from the dust-laden crude gases and almost completely to completely re-fed into the entrained flow.

The invention takes advantage of the findings that an entrained-flow gasification with an internally circulating entrained flow associated with a moving-bed gasification arranged below the entrained-flow gasification makes possible to perform the practically complete conversion of pulverized fuels to oxidized ashes and slags and to crude gases in such a way that the dust-laden crude gases can be drawn off from the entrained flow at temperatures corresponding to the crude gas exiting temperatures of the fluidized-bed gasification and the oxidized ashes and slags from the moving bed at temperatures <600° C., preferably <500° C., particularly preferably <400° C. The vertical extension of the entrained flow ranges from the crude gas outlet at the upper end of the entrained-flow gasifier to the surface of the moving bed. The moving bed ranges downward to the bottom product outlet that is positioned at the lower end of the gasification reactor for the entrained-flow gasification.

Essential to the invention is the self-regulating cooperation of the processes of gasifying the solid fuels and agglomerating the ash to coarse-grained agglomerates in the circulating entrained flow, with establishing below the circulating entrained flow the moving bed that includes predominantly coarse-grained agglomerates, whereby the material properties of the solid fuels can vary over a wide range without exerting disturbing influences on the process. Therefore the teaching differs fundamentally from the proposals for solution described in DE 26 40 180 B. This is true of both the whole process (basically different establishment of hot and "cold" reaction zones or of the different gasification zones, namely moving bed, fluid bed, entrained flow) and the partial processes like the feeding of the solid fuels (pulverized versus dust up to necessarily coarse-grained), the output of the gasification residues from the moving bed- or fixed bed zones (output regulated with regard to fuel ash versus regulated with regard to coarse-grained coal proportion), vertical gas circulation in the dust gasification zone (hot upward central flow versus centrally downward introduction of gases).

The gasification in a circulating entrained flow is established as follows. As solid fuels the pulverized fuels to be gasified and the re-fed C-containing dusts and also aftergasification crude gases and first gasification agents are introduced into the entrained flow. Said gasification agents are introduced in such a ratio to the amount and composition of the supplied solid fuels that temperatures are adjusted at the crude gas outlet that are below the critical ash-gasification sintering temperature but at least so high that almost complete gasification of the C-containing constituents takes place. The dusts carried along with the dust-laden crude gases will have C-contents of <approximately 30 to <80 mass-%. After separation from the crude gases the C-containing dusts are practically completely re-fed into the entrained flow and aftergasified. It is essential to an almost complete gasification that high-oxygen gasification agents are used. The oxygen concentrations of said gasification agents are adjusted within a range of values of 21 to 100 vol.-%, preferably of 40 to 70 vol.-%, if hydrogen is used with vapour/oxygen ratios of 0 to 1.5 kg/m$^3$ (at normal conditions) accordingly. The high values of the oxygen concentrations apply to pulverized fuels with high ash contents and high ash-flowing temperatures.

That temperature value is defined as the critical ash-sintering temperature $t_{Sp}$ below that the temperature must fall so that the ash in the free board and on cooling of the dust-laden crude gases does not cause baking on or plugging. Non-representative typical numerical examples of the critical ash-sintering temperature $t_{Sp}$ are 700° C., for example, for biomasses, 1000° C., for example, for lignitic coal and 1100° C., for example, for hard coal. With lignitic coals having a critical ash-sintering temperature of, for example, 1000° C. an almost complete gasification is given, if the temperatures at the crude gas outlet are 900 to 950° C. (temperature range 50 to 100 K). Thus the invention utilizes the temperature difference between both this characteristic temperatures, relevant for most pulverized fuels. As far as the critical ash-sintering temperature $t_{Sp}$ is below the temperature required for gasification, such as with some biomasses, aggregates that raise the melting and sintering temperatures must additionally be added in order to raise the critical ash-sintering temperature $t_{Sp}$ above the gasification temperature. The aggregates raising the sintering temperature can be fed either together with the solid fuels or separate from the solid fuels.

The internally circulating entrained flow is established as follows. The solid fuels are, like the first gasification agents, introduced locally separate therefrom into the gasification chamber in the bottom zone of the entrained flow; also introduction in form of slurries is suitable. Depending on the thermal potential of the entrained-flow gasifier and the fuels to be fed one or several supply nozzles are provided, preferably distributed over the periphery of the entrained-flow gasifier and preferably distributed in a nozzle plane. The first gasification agents are injected through gasification agent nozzles with the injection being aligned vastly horizontal and vastly radial to the axis of flow of the gasification chamber, taking place at input velocities of >10 to approximately 80 m/s. The gasification agent nozzles are also preferably positioned at one nozzle plane. It is also possible to perform the locally separated input of the fuels and the gasification agents over one or several dust burners.

The gasification in the internally circulating entrained flow enables to use baking and swelling coals and high-ash coals with highest ash-flowing temperatures due to the very fast heating velocities and the fast distribution in the reaction chamber. To ensure that it is decisive that temperatures develop in the flame zone that exceed the ash-flowing temperatures by approximately 1000 K and even more.

Because the gasification agents enter the gasification chamber at fast flowing velocities flame zones develop in front of the gasification agent nozzles having temperatures up to >2000° C. that create a hot upward flow, preferably in form of a central flow. In the flame zones and in the hot zone of a developing central flow the ash softens, melts and agglomerates. This coarsens the grain size of the ash (approximately 1 to 5 mm), until the agglomerates from the entrained flow move downward into the moving bed. With increasing height the flame zones, or the central flow, respectively, widen until they fill the entire cross-section of the gasification chamber approximately in form of a pipe flow at the crude gas outlet at the latest. At the same time due to the endothermic reactions the flow cools on the flow path to the crude gas outlet reaching temperatures that correspond to the temperatures when the endothermic gasification reactions stop. The hot central flow is surrounded by a downward "cold" wall flow where also the endothermic reactions dominate. The wall flow comprises the particles that due to gravity fall out of the flame zones and the central flow, sinking downward, and is heavily loaded with solids. At the lower end of the entrained flow the wall flow re-mixes with the upward flow while coarser particles settle down. Thus the reaction zone of the internally circulating entrained flow comprises one or several central hot reaction zones where predominantly the exothermic oxidation reactions proceed and the granulation of the ash takes place, and near to the gasifier head of the gasifier wall and the surface of the moving bed a "cold" reaction zone where the endothermic gasification reactions dominate and the greater part of the C-conversion takes place. The zone of the pipe flow at the upper end of the gasification chamber to a certain extent forms a buffer zone for the required fading away of the temperatures before the crude gas flows out.

Already when the introduced pulverized fuels pass through the hot reaction zones for the first time most part of the ash is granulated and discarded downward into the moving bed. Due to the advantageous conditions for ash granulation in the hot central reaction zones the amount of the dusts entrained by the dust-laden crude gases decreases to a very low level, corresponding to the one to two times the amount of the ash introduced with the pulverized fuels. Due to the specific establishment of the gasification reactions and the flow directing reaction conditions are created in a confined space that allow to draw off crude gases with low dust loads from the entrained-flow gasifier at temperatures below the critical ash-sintering temperature $t_{Sp}$ that without any additional effort can be passed to further processing in waste heat vapour generators for waste heat use. If it becomes necessary for difficult pulverized fuels because of a not completely avoidable danger of contamination and pluggage by the dust-laden crude gases drawn off from the entrained-flow gasifier, to perform a further cooling, then at the head of the entrained-flow gasifier preferably water or water vapour is injected, depending on whether an intense cooling (>approximately 200 K, preferably >100 K) or a less intense cooling (<approximately 200 K, preferably <100 K) is required. During this additional cooling, advantageously, an endothermic reaction conversion takes place due to gasification reactions (quench conversion).

The moving bed is adapted to the requirements of the entrained flow as follows. The second gasification agents are supplied considering amount and composition in such a way that on the one hand, the ash-softening temperature will not be exceeded and on the other hand, the moving bed is regularly passed, i.e. neither channel-like nor fluid bed-like. The low oxygen content ensures that the ash and ash granulates are almost completely after-oxidized, while avoiding softening or melting. In this way the requirement of a non-plugging and non-slagging operation of the moving bed is fulfilled. Depending on the level of the ash-softening temperature of the used fuels oxygen concentrations in the range of approximately 5 to approximately 20 vol.-% have found suitable. The oxygen supplied with the second low-oxygen gasification agents is about 10 to 30% of the total oxygen supplied. The higher values are to be assigned to high-ash coals as due to the increased ash outputs higher carbon loads are entrained.

An advantage of the invention is that the chemical oxygen consumption for the oxidation of the ash constituents of the bottom products, or the fuel ashes, respectively, is comparably lower than with the traditional fixed-bed gasification; for example, to the Lurgi principle. It is known of said principle that a certain percentage of the gasification oxygen is getting lost to the actual gasification process because it is needed for the further oxidation of the predominantly non-vitrified fuel ashes to the highest oxidation stages. That is not the case in this invention as the highly predominant quantitative ash portions of the pulverized fuels are melted in reducing gas atmospheres at a minimal chemical oxygen demand and the ash granulates produced thereby behave inert against oxygen in the moving bed.

The amount of the supplied second gasification agents is limited to such values that the flow velocities of the forming aftergasification crude gases at the upper end of the moving bed (related to the solids-free flow cross-section) do not exceed 0.1 to 0.5 m/s, preferably 0.1 to 0.3 m/s. The low upper limit of the flow velocities applies to conditions in the entrained flow under which by using gasification agents with relatively low oxygen concentrations predominantly very fine-grained ash granulates with grain sizes mainly <0.5 mm form (for pulverized fuels, for example, with high-melting ashes but low critical ash-sintering temperatures), while accordingly the upper limit applies to conditions where by using gasification agents with relatively high oxygen concentrations predominantly coarse-grained ash granulates with grain sizes mainly >0.5 mm form. Also in case of high-ash pulverized fuels it may be useful to set high flow velocities around 0.5 m/s. Accordingly high proportions of carbon are converted and the ash is correspondingly cooled down. In the whole, high flow velocities have a positive effect in that the grain sizes of the agglomerates forming the moving bed enlarge, with the positive result of homogenizing the passability of the moving bed.

The flow velocities of the aftergasification crude gases when exiting the moving bed with 0.1 to 0.5 m/s are sufficiently fast so that only little shares of the pulverized fuels introduced into the gasification chamber separate on the moving bed. Therefore the C-concentration in the moving bed is normally so low that oxygen is hyperstoichiometric related to carbon so that the carbon conversion is practically complete with further oxidation of all oxidizable ash constituents being ensured. The aftergasification crude gases upward entering the circulating entrained flow are mixed therein, thermically treated, participating in the gasification reactions according to the present conditions of gasification.

For the countercurrent cooling of the oxidized bottom products preferably second gasification agents are used that consist of oxygen and carbon dioxide (instead of water vapour) with their temperature as near as possible to the ambient temperature. Therefore it is possible to utilize the sensible heat of the oxidized bottom products for the gasification process in the entrained-flow gasifier and, on the other hand, to do without aftercooling normally necessary for handling the ash. The advantages of the use of carbon become clear by that the outlet temperatures of the bottom products of below approximately 650° C., preferably below approximately 600° C. in case of oxygen and vapour as second gasification agents, can be reduced to below approximately 400° C., preferably to below approximately 300° C. in case of carbon dioxide instead of water vapour. The almost C-free oxidized bottom products can be disposed of without problems or further used. Another advantageous embodiment of the invention consists in that vapour, which is produced in the water jacket surrounding the gasification chamber, is partly or completely supplied to the second gasification agents.

Additionally, it has to be pointed out that during operation the depth of the moving bed can be determined by, for example, a radiometric level measurement and set to have the desired depth and/or maintained constant by controlling the withdrawal of the bottom products. The bottom product withdrawal outlet is, for example, by means of a rotary grate in known proven manner. The rotary grate also functions to feed and distribute the second gasification agents over the cross-section of the moving bed.

According to the invention the problem is solved by a gasification reactor for the entrained-flow gasification of solid fuels under pressure that essentially comprises a pressure vessel (3) that can be cooled and an inner jacket (7) that is equipped with a heat shield, with at least one crude gas outflow (8) located at the upper end of the pressure vessel (3) and at least one bottom product withdrawal outlet (9) at the lower end of the pressure vessel (3), the pressure vessel (3) having at least enough space for a moving bed and an entrained flow that circulates internally above the surface (12) of the moving bed and a buffer zone situated above said entrained bed, whereby at a height of between approximately 1 and 3 m above the surface (12) of the moving bed (13) feed connections (15) for the solid fuels and gasification agent nozzles (16) for the supply of first gasification agents (17) are situated, the gasification agent nozzles (16) being designed to inject the first gasification agents into the entrained flow in such a way that a hot central upward flow and a "cold" downward wall flow are formed, and whereby at least one feed device for second gasification agents is located at the bottom product withdrawal outlet (9).

The enclosing walls of the gasification chamber, which reach from the crude gas outflow (8) at the upper end to the bottom product withdrawal outlet (9) at the lower end of the gasification reactor for entrained-flow gasification, are over their height designed preferably without considerable changes of the cross-section, easiest with a cylindrical shape. The whole gasifier is similar to fixed-bed gasifiers preferably equipped with a water jacket for cooling; but also water-cooled pipe diaphragm walls can be used. The protection of the gasifier inner jacket (7) at the hot side consists preferably in a usual studding or a ceramic thin coating such as SiC or other refractory materials as a ceramic protection.

According to an advantageous embodiment of the invention the gasification agent nozzles (16) are arranged evenly distributed over the periphery of the outer pressure jacket (5), oriented radial, inclined 10° to 30° upward.

The feed connections (15) for the solid fuels are advantageously situated at approximately the same level or below the gasification agent nozzles (16).

The height position of the gasification agent nozzles and the feed connections can be varied within certain limits. The feed connections are positioned at the same level or up to approximately 1 m below the gasification agent nozzles and at least approximately 1 m above the surface of the moving bed. Preferably, the gasification agent nozzles and the feed connections are positioned at a common plane, approximately 1 to 3 m above the surface of the moving bed. Observing the vertical minimum distance of the feed connections to the moving bed ensures that the solid fuels can be undisturbedly supplied, the equal or deeper position of the feed connections compared with the gasification agent nozzles ensures that free oxygen does not react with the solid fuels close to the walls.

The bottom product withdrawal outlet (9) is advantageously designed as rotary grate.

The internally circulating entrained flow (11) is established above the surface (12) of the moving bed (13). The buffer zone is located above the internally circulating entrained flow (11).

The combination of an internally circulating entrained flow and a moving bed below the circulating entrained flow in the manner according to the invention results in a fundamental simplification of the whole plant system and operation of the gasification process. The most important simplifications relate to the gasification reactor for entrained-flow gasification. The enclosing walls of the gasification chamber that reach from the crude gas outlet at the upper end until the bottom product withdrawal outlet at the lower end of the entrained-flow gasifier are designed over their height without considerable cross-section changes, easiest in form of a cylinder. The heat shield of the gasifier inner jacket on the hot side consists preferably in a usual studding and a ceramic coating. No brick lining is required. In case of ceramic coatings short start up and closing down times can be realized. On the crude gas side no hot cyclones, cold gas quenches nor cooling and aftertreatment devices for the separated dusts, on the bottom product side no cooling and aftertreatment devices are required. Finally, the supply of the gasification agents and solid fuels can be drastically simplified in that instead of expensive integrated burner structures separate systems with cooled pipe feeders can be provided.

Also a system for entrained-flow gasification under pressure is part of the invention. Said system comprises a gasification reactor according to the invention with associated devices for the supply of gasification agents and solid fuels, for further processing of the crude gases and disposal of the ash.

The crude gas outflow (8) of the gasification reactor is connected to a waste heat exchanger (25), after which a dust separator for separation of the entrained dusts and a tight flow conveyor for re-feeding the separated dusts into the internally circulating entrained flow (11) are provided.

The crude gases leaving the dust separator can be used or before use supplied to a gas prepsrating device.

BRIEF DESCRIPTION OF THE DRAWING

FIG. 1 explains an embodiment of the invention in detail.

DESCRIPTION OF PREFERRED EMBODIMENTS

FIG. 1 shows in an extremely simplified schematic representation a gasification reactor (I) with internally circulating entrained flow. The gasification chamber (3) of the gasification reactor (I) for entrained-flow gasification is enclosed in a cylindrical pressure vessel (4) that comprises an outer pressure jacket (5), a water chamber (6) and an inner jacket (7). The inner jacket (7) is studded and coated with a refractory material as ceramic protection. At the upper end of the entrained-flow gasifier (1) the crude gas outflow (8), at the lower end the bottom product withdrawal outlet (9) is situated, with only the top contour of the rotary grate (10) of said bottom product withdrawal outlet (9) being indicated in the FIGURE. The internally circulating entrained flow (11) is established over the surface (12) of the moving bed (13). On a plane (14) at a height of approximately 1 m above the surface (12) of the moving bed (13) there are two feed connections (15), offset by 180°, for the tight flow supply of the pulverized dry lignitic coal (2) and six gasification agent nozzles (16) for the supply of the first gasification agents (17). The gasification agent nozzles (16) are arranged evenly distributed over the periphery of the outer pressure jacket (5). Said nozzles (16) are oriented radial, inclined upward by 30°.

The crude gas outflow (8) is connected to the waste heat exchanger (25), whereby after said heat exchanger (25) a hot gas filter (26) for separating the entrained dusts and a tight flow conveyor for re-feeding the separated dusts (20) into the internally circulating entrained flow (11) are positioned.

In the gasification reactor (1) for entrained-flow gasification pulverized dry lignitic coal (2) with a water content of 12 mass-%, an ash content of 6 mass-% and a critical ash-sintering temperature of 1000° C. is gasified. To make things easier to understand the quantitative supply of the first gasification agents (17) is explained in the following related to the reference basis of 1 kg of dry lignitic coal (2). Related to 1 kg of dry lignitic coal (2), altogether 0.366 m³ (normal conditions) oxygen (18), 0.058 m³ (normal conditions) carbon dioxide (29) and 0.171 kg water vapour (19) are fed.

The first gasification agents (17) are injected at a flow velocity of 30 m/s and a temperature of 280° C. through the gasification agent nozzles (16) into the gasification chamber (3) of the gasification reactor (1). In addition to the first gasification agents (17) and the pulverized dry lignitic coal (2), re-fed dusts (20) and the aftergasification crude gas (21) that leaves the surface (12) upward are supplied into the internally circulating entrained flow (11).

While intensely mixing the introduced materials in the internally circulating entrained flow (11) the hot central upward flow (22) forms enclosed by the "cold" downward wall flow (23). In the hot central upward flow (22) the ash granulates to form ash granulates that settle down with a grain size of mainly 2 mm on the surface (12) of the moving bed. The dust-laden crude gases (24) that have a dust load of approximately 30 g/m³ (normal conditions), with the dusts consisting quantitatively half of carbon and half of ash, leave the entrained-flow reactor (1) at a temperature of approximately 950° C. over the crude gas outflow (8) and pass into the hot gas filter (26) over the waste heat exchanger (25), where said gases (24) are cooled to approximately 250° C. In the hot gas filter (26) the entrained dusts (20) are practically completely separated and re-fed into the circulating entrained flow (11) by means of a device for tight flow conveying (27).

Over the rotary grate (10) the second gasification agents (28) that are mixed from oxygen (18) and carbon dioxide (29) in the volume ratio of 10 vol.-% oxygen to 90 vol.-% carbon dioxide are supplied into the moving bed (13) at a temperature of 80° C. The oxidized bottom products (30) that are drawn off over the bottom product withdrawal outlet (9) leave the entrained-flow gasifier (1) at a temperature of 140° C. The C-content of said bottom products (30) is <2 mass-% so that they can be environmentally suitably disposed of or further utilized. The second gasification agents (28) are supplied in such an amount that flow velocities about 0.3 m/s related to the free flow cross-section establish at the surface (12) of the moving bed (13). This ensures a homogeneous, regular passage of the moving bed (13).

Nomenclature
1 gasification reactor for entrained-flow gasification
2 pulverized dry lignitic coal
3 cylindrical pressure vessel
4 pressure vessel
5 outer pressure jacket
6 water chamber
7 inner jacket
8 crude gas outflow
9 bottom product withdrawal outlet
10 top contour of the rotary grate
11 internally circulating entrained flow
12 surface
13 moving bed
14 plane
15 feed connection
16 gasification agent nozzles
17 first gasification agents
18 oxygen
19 water vapour
20 dusts
21 aftergasification crude gas
22 hot central flow
23 "cold" wall flow
24 dust-laden crude gases
25 waste heat exchanger
26 hot gas filter
27 device for tight flow conveying
28 second gasification agents
29 carbon dioxide
30 oxidized bottom products

What is claimed is:

1. Method for the entrained-flow gasification of solid fuels under pressure, whereby in an upward internally circulating entrained flow, using first oxygen-rich gasification agents
   a) the practically complete gasification of the carbonaceous components of the solid fuels and
   b) a thermal treatment of aftergasification crude gases and also
   c) the granulation of the ash at temperatures above the ash-softening temperature take place,
   whereby carbon-containing gasification residues, ash granulates and dust-laden crude gases are formed and dust-laden crude gases are drawn off at temperatures below the critical ash-sintering temperature from the entrained flow upward into a buffer zone and from there passed to further processing, whereby the first gasification agents are injected into the entrained flow in such a way that a hot central upward flow and a "cold" downward wall flow are formed, whereby in a moving bed located below the entrained flow by use of second low-oxygen gasification agents an almost complete to totally complete oxidation of the carbon-containing gasification residues and ash granulates that leave the entrained flow in downward direction takes place at temperatures below the ash-softening temperature, whereby aftergasification crude gases and oxidized bottom products are formed, whereby the second gasification agents are fed in such an amount and composition that on the one hand, the ash-softening temperature will not be exceeded in the moving bed and on the other hand, the moving bed will be regularly passed, and whereby the oxidized bottom products are drawn off from the moving bed downward in countercurrent to the second gasification agents and the aftergasification crude gases are passed upward from the moving bed into the entrained flow.

2. Method according to claim 1 wherein the dust-laden crude gases drawn off from the entrained flow are preferably fed to indirect heat exchangers and subsequently to dust separators for separating C-containing dusts and that the carbon-containing dusts are almost completely to completely re-fed into the entrained flow.

3. Method according to claim 1, the first gasification agents are supplied with oxygen contents of 21 to 100 vol. -%.

4. Method according to claim 1, wherein the second gasification agents are supplied rotary oxygen contents of 5 to 20 vol. -%.

5. Method according to claim 1. wherein the second low-oxygen gasification agents consist of oxygen and carbon dioxide and are introduced at temperatures of preferably <100 ° C. into the moving bed.

6. Method according to claim 1, wherein the solid fuels are chosen from pulverized fuels, carbon-containing dusts or mixings thereof or solids-containing fuel/water- or fuel/oil slurries.

7. Method according to claim 1, wherein the supply of the solid fuels takes place at the same level or up to approximately 1 m below the level of the supply of the first gasification agents, but at least approximately 1 m above the surface of the moving bed.

8. Method according to claim 1, wherein the solid fuels are introduced by means of tight flow conveying and/or in form of slurries.

9. Method according to claim 1, wherein the first gasification agents are injected into the gasification chamber at flow velocities of >10 to approximately 80 m/s.

10. Method according to claim 1, wherein in addition, addings that raise the melting and sintering temperatures are supplied to the solid fuels when the critical ash-sintering temperature thereof is below the temperature necessary for gasification.

* * * * *